United States Patent Office 2,897,148
Patented July 28, 1959

2,897,148

PROCESS OF PURIFYING AND UTILIZING RESIDUAL WATERS RESULTING FROM THE MANUFACTURE OF PAPER PULP PREPARED BY THE SODA PROCESS

Pierre Laboureur, Neuilly-sur-Seine, France, assignor to Societe d'Etudes et d'Applications Biochimiques, Jouy-en-Josas, France, a corporation of France No Drawing. Application February 23, 1955
Serial No. 490,139

Claims priority, application France March 3, 1954

10 Claims. (Cl. 210—11)

This invention relates to a process of purifying residual or waste waters from the manufacture of paper pulp prepared by the soda process. It also relates to the production of such useful commercial products as fertilizers, soil conditioners, yeasts, cattle foods, vitamins of the B group, and sources of protein from these waste waters.

Purification of waste waters from the manufacture of paper pulp has been a major problem for paper producers for some time. Generally, these waste waters contain large amounts of organic matter, principally lignin compounds. When introduced into streams and rivers, the organic matter ferments, thereby polluting these waterways. Pollution not only destroys most of the life in these streams but also renders the water substantially unfit for industrial and human consumption. Accordingly, legislative bodies have enacted laws which require that these waste waters be purified before their release into streams and rivers. Not only has treatment of these residual waters been a technical problem, but also an economic one from the standpoint of increased costs of paper manufacture. Specifically, purification of the residual waters has necessitated additional facilities in which the waters are treated with chemicals for removal of the organic matter therein. Consequently, paper manufacturers have sought a process which both purifies the waste waters to the degree required by law and which produces commercial by-products.

Heretofore, some paper producers have treated their waste waters with strong acids, such as sulphuric, hydrochloric, nitric and oxalic, to precipitate organic matter therein. One serious shortcoming of this treatment is its inability to remove the organic matter in solution. The organic matter remaining in solution is likely to ferment and to pollute the streams and rivers into which it is released.

Other paper producers have attempted purification of their residual waters by treatment with yeast organisms. This treatment, like the foregoing one, fails to remove or to render inactive the organic matter in solution.

A third method for treating waste waters has employed flowing the waters over beds of activated muds. The great quantity of organic material in the waters quickly clogs these beds, thereby rendering this method wholly inadequate.

I have invented a process which, in addition to purifying the waters to the degree required by law, produces commercial by-products. Thus, users of my process realize a return from the additional investment and cost of treating such waters. Generally, I employ a two-stage process, but in some instances where further purification of the products of the second stage is desirable, I add a third stage. The first stage of my process comprises treating the waste waters with acid, preferably a mineral acid, in an amount to precipitate the major portion of the organic matter therein. Next, I separate the precipitated organic matter from the waters to produce a primary effluent. In the second stage of my process, I treat the primary effluent with a fermentation agent to form a culture from which I separate fermentation products resulting from the treatment with the fermentation agent to make a secondary effluent. If the secondary effluent requires further purification, I flow it over an oxidizing medium to produce a tertiary effluent. The production of the tertiary effluent from the secondary effluent is the third stage of my process. As will be pointed out hereinafter, products from my process are useful and have a commercial value.

Referring specifically to the first stage, I treat the residual waters with a strong acid, in an amount equal to 500–2,000 cc., preferably 800–1,600 cc., of 66° Bé. sulphuric acid per 1,000 kg. of residual water. It is preferred that the amount of acid added be such as to adjust the pH of the waters to about 4.0 to about 4.5. This degree of acidity is desirable for two reasons. First, at this pH range there is a maximum precipitation of the organic matter in the waters for the amount of acid used. Second, 4.0 to 4.5 pH is highly conducive to development of the desired organisms (to be described hereinafter). Generally, one part of sulphuric acid per 1,000 parts of residual waters produces this pH range.

Next, I heat the waters and acid to a temperature between 45° and 50° C. and then mechanically stir the mixture to expedite escape of gas bubbles, especially carbon dioxide. An alternative procedure is to heat the waters to the required temperature before adding the acid.

The result of this acid treatment is a precipitation of the major portion of the organic matter in suspension and/or in solution in the residual waters. Generally, the precipitate comprises lignin compounds, hemicellulose of the alpha type and hydrolysis products. Preferably, the acid treatment precipitates 75 percent of the organic matter in the waters.

An efficient and quick precipitation results from the addition of a precipitation agent in an amount equivalent to 0.1 to 100 parts per million parts of the water. By a precipitation agent as used in this specification, I mean selenium, iron, aluminum, chromium, tin, or any other metal able to improve precipitation.

A suitable centrifuge separates the precipitate from the residual waters, thus producing a primary effluent. The primary effluent, which is the starting material of my second stage, comprises beta hemicelluloses, carbon hydrates, secondary organic compounds produced by hydrolysis, and mineral salts.

The precipitate is dried, or in the alternative, treated with selected organisms, such as *Aspergillus flavus*, left to ferment for about fifteen days, and then dried. The resulting material is both a soil conditioner and a soil fertilizer.

I have found two methods by which I can carry out my second stage. These two methods differ from one another by the fermentation process employed. One method uses yeast as the fermentation agent, while the other uses nitrogen fixing organisms as its fermentation agent.

Referring first to the method which employs yeast as the fermentation agent, I treat the primary effluent with yeast germs, such as activated stock of *Torula utilis*, of *Rhodotorula rubra* and of various species of Saccharomyces to form a culture.

Increased yield and speed of development of the yeast culture results from adding to the primary effluent one or more of the following enriching agents: superphosphates, nitrates, ammonium sulphates and phosphates and metallic salts, in amounts equal to about 0.1 per mil to 1 per mil by weight. Other enriching agents which give satisfactory results are complex nitrogenous organic substances and vegetal hormones, in amounts less than 0.25 per mil by weight. While the use of enriching agents is preferable, the success of the second stage is not dependent thereon.

Next, I agitate the culture by passing filtered air therethrough for 24 to 48 hours during which I maintain the temperature of the culture between 27° and 30° C.

To separate fermentation products or yeast resulting from the treatment of the primary effluent with the yeast from the culture requires making a medium such as a gel which has the property of fixing fermentation products. To form such a gel I introduce into the culture aluminum sulphate in an amount equal to about 0.5 per mil to about 1 per mil by weight. Then I add a basic material, such as a diluted soda solution or a calcium salt in an amount sufficient to adjust the pH of the culture to about 8.0 to 8.5.

A conventional decantation device separates the gel having the fermentation products from the culture, thereby producing a secondary effluent freed of the greater part of the fermentable organic matter from the primary effluent.

One cubic meter of culture yields about 10 kg. of damp yeast or 1 kg. of dry yeast. The dried yeast makes commercial products such as cattle food, a source of vitamins of the B group, and a source of protein.

Considering next the second of the two methods by which I carry out the second stage of my process, I treat the primary effluent with organisms of the nitrogen fixing type, such as Bacteria aerobia of the Azotobacter and Agrobacterium types to produce a culture. Preferably, I employ the following nitrogen fixing organisms: *Azotobacter chroöcoccus*, *Azotobacter vinelandii*, *Azotobacter bedjerinkii* and Agrobacterium which fix atmospheric nitrogen without secreting any into the primary effluent.

These organisms are particularly suited for purifying waste waters because they consume much carbon and utilize products of decomposition and of hydrolysis of the carbon hydrates which products are not easily assimilated by other organisms. In addition, they have the highly desirable property of fixing atmospheric nitrogen, hence their fermentation products make excellent fertilizers. Furthermore, their protoplasms contain as much as 35 to 40 percent protein, thus constitute good sources of protein.

To satisfy the calcium requirements of the Azotobacter organisms, I add to the primary effluent calcium carbonate or a mixture of a superphosphate and calcium carbonate in amounts sufficient to adjust the pH of the primary effluent to about 6.5 to 7.2.

Addition of enriching agents to the primary effluent increases the speed of development and the yield of the cultures into which nitrogen fixing organisms are introduced. To avoid development of organisms other than the Azotobacter type, I treat the primary effluent with selected antiseptic products in amounts less than 1 per mil by weight. As in the first described method for carrying out the second stage, the use of enriching agents and selected antiseptic products is preferable but not essential.

The next step in this method is agitating the culture by passing filtered air therethrough for 40 to 50 hours. During this period, the culture is maintained at a temperature between 25° and 30° C.

As in the first method, the products of this method are a secondary effluent and a gel which has the property of fixing fermentation products resulting from the treatment of the primary effluent with nitrogen fixing organisms. Separation of the gel from the culture requires the same procedure as that described for the first method. This procedure includes forming an alumina gel and separating it from the culture to make the secondary effluent. Likewise, purification of the fermentation products follows the same steps as that used for purification of the fermentation products of the first method.

The third stage of my invention comprises flowing the secondary effluent over an oxidizing medium, such as coke beds or activated mud to produce a tertiary effluent. The purpose of the third stage is to complete the oxidation of the organic matter remaining in the secondary effluent. Generally, I use the third stage only when the amount of organic matter remaining in the secondary effluent is excessive. The tertiary effluent from this third stage is sufficiently free of fermentable organic matter to permit its release into streams and rivers.

An alternative way of carrying out my process comprises omitting the second stage and flowing the primary effluent over activated mud to oxidize the organic matter therein. The product of this alternative way is a colorless effluent which makes a soil fertilizer.

A variation of the alternative way comprises first treating the activated mud with nitrogen fixing organisms, such as the Azotobacters, before passing the primary effluent over the mud. The nitrogen fixing organisms accelerate and intensify the oxidation of the organic matter.

While the alternative way and its variation produces a useful product and is simpler to carry out than the second stage, it does not yield the useful by-products resulting from treatment of the primary effluent by fermentation agents.

The following examples further illustrate my invention.

*Example 1*

I treat 1,000 kg. of residual water from paper pulp manufactured by the soda process with 900 cc. of 66° Bé. sulphuric acid to precipitate the organic matter in the waters. Next, I bring the waters and acid to a temperature of 50° C. and then subject it to mechanical stirring to expedite escape of gas bubbles. A centrifuge separates the resulting precipitate from the water, thereby producing a primary effluent. The precipitate from this acid treatment weighs 50 kg., thus leaving 950 kg. of primary effluent.

Next, I enrich the primary effluent with ammonium phosphate, in an amount equal to 0.5 per mil by weight and with vegetal hormones in an amount equal to 0.05 per mil by weight. Following this step, I treat the primary effluent with a selected stock of *Torula utilis* to make a culture. For 36 hours at a temperature of 29° C. I agitate the culture by passing filtered air therethrough.

To the culture I add 500 grams of aluminum sulphate and 1,800 cc. of 36° Bé. soda solution to bring the culture to a pH of 8.2. The result of this procedure is a fluid alumina gel which fixes the yeast thereto. Next, I separate the gel from the culture, thereby making a secondary effluent. This second stage produces 12 kg. of damp yeast and 930 kg. of secondary effluent.

Finally, I pass the secondary effluent over a coke bed 75 cm. thick to produce 920 liters of a tertiary effluent.

*Example 2*

1,000 kg. of residual water is treated with 1,500 cc. of 66° Bé. sulphuric acid. Next, the mixture is heated to 45° C. and subjected to mechanical stirring to permit escape of gas bubbles. The precipitate resulting from this treatment is separated from the mixture to produce a primary effluent. The yield from this first stage is 200 kg. of precipitate and 800 kg. of primary effluent.

Enrichment of the primary effluent with 0.75 per mil by weight of equal parts to superphosphate and ammonium sulphate follows, after which I treat the primary effluent with a selected stock of *Torula utilis* to make a culture. Then the culture is agitated by passing filtered air therethrough for 36 hours at 30° C.

At the end of the fermentation period, I add 1,000 grams of aluminum sulphate and 1,800 cc. of 36° Bé. soda solution to adjust the pH of the culture to 8.2. The result of the addition of aluminum sulphate and the soda solution is a fluid alumina gel which fixes the fermentation products thereto. The yield from this second stage is 18 kg. of damp yeast and 780 kg. of a secondary effluent.

Finally, I flow the secondary effluent over a coke bed 75 cm. thick to obtain 770 liters of a tertiary effluent.

Example 3

I treat the residual waters in the same manner as set forth for Example 1 to produce a primary effluent. Next, I add to the primary effluent calcium carbonate in an amount to adjust the pH of the primary effluent to 7.1. Then I treat the primary effluent with a selected stock of *Azotobacter chroöcoccus* to produce a culture. Following this, I agitate the culture by passing filtered air therethrough for 40 hours at a temperature of 27° C.

At the end of this period, I add to the culture 500 grams of aluminum sulphate and 150 cc. of 36° Bé. soda solution to adjust the pH of the culture to 8.1. This procedure produces an alumina gel which has the property of fixing the fermentation products. Next, I separate the alumina gel from the culture, thereby producing 9 kg. of damp Azotobacter and 930 kg. of a secondary effluent.

Example 4

1,000 kg. of residual water is treated as described in Example 2 to produce a primary effluent. To the primary effluent, I add a mixture of calcium carbonate and superphosphate to adjust its pH to 6.9. Next, I treat the primary effluent with a selected stock of *Azotobacter chroöcoccus* to produce a culture, then agitate the culture by passing filtered air therethrough for 35 hours at 29° C. To separate the fermentation products from the culture, I add thereto 1 kg. of aluminum sulphate and 200 cc. of 36° Bé. soda solution to produce an alumina gel. Next, the alumina gel which fixes the fermentation products is separated from the culture, thus producing a secondary effluent. The yield from the foregoing is 12 kg. of damp Azotobacter and 785 kg. of secondary effluent.

From the foregoing it is clear that my invention has important features. First, it purifies the waste waters from the manufacture of paper pulp by the soda process to the degree required by law.

Second, it manufactures commercial by-products, such as fertilizers, soil conditioners, and cattle food. In addition, some of the by-products are a source of vitamins of the B group and of proteins. Hence, users of the process can not only lower their costs of paper manufacture but also realize a return from the investment required to treat these waste waters.

While certain preferred embodiments of the invention have been described, it will be understood that they may be otherwise embodied within the scope of the following claims.

I claim:

1. A process of treating residual waters resulting from the manufacture of paper pulp prepared by the soda process to purify said waters to render them substantially harmless to streams where they may be discharged, and simultaneously to produce commercially valuable fermentation products, which comprises first, treating the residual waters with an acid in an amount sufficient to create a pH of 4 to 4.5 in the waters; heating the waters to between about 45–50° C. to precipitate a major portion of the suspended organic matter in the waters; separating any precipitated organic matter from the residual waters to produce a primary effluent; then treating the primary effluent with a fermentation agent selected from the group consisting of *Torula utilis*, *Rhodotorula rubra* and species of *Saccharomyces*; agitating the primary effluent at a temperature between about 25–30° C. to form commercially valuable fermentation products; and separating the fermentation products from the effluent.

2. A process according to claim 1 wherein a precipitation agent from the group consisting of selenium, iron, aluminum, chromium and tin is added to the residual waters to aid in the precipitation of the suspended organic matter in the waters.

3. A process according to claim 1 wherein an enriching agent selected from the group consisting of superphosphates, nitrates, ammonium phosphates, ammonium sulphates and metallic salts is added to the primary effluent to aid in the fermentation.

4. A process according to claim 1 wherein the fermentation products are separated by forming a gel to fix the fermentation products; said gel being formed by adding aluminum sulphate and basic material to the primary effluent after the fermentation.

5. A process according to claim 1 wherein, after removal of the fermentation products, the effluent is flowed over an oxidizing medium to oxidize any remaining organic matter therein.

6. A process of treating residual waters resulting from the manufacture of paper pulp prepared by the soda process to purify said waters to render them substantially harmless to streams where they may be discharged, and simultaneously to produce commercially valuable fermentation products, which comprises treating the residual waters with an acid in an amount sufficient to create a pH of 4 to 4.5 in the waters; agitating and heating the waters to between about 45–50° C. to precipitate a major portion of the suspended organic matter in the waters; separating any precipitated organic matter from the residual waters to product a primary effluent; then treating the primary effluent with an organism selected from the group consisting of *Azotobacter chroöcoccus*, *Azotobacter vinelandii*, *Azotobacter bedjerinkii* and *Agrobacterium*; agitating the primary effluent at a temperature between about 25–30° C. to form fermentation products, and separating the fermentation products from the effluent.

7. A process according to claim 6 wherein basic calcium compound is added to the primary effluent simultaneously with said organism to adjust the pH to about 6.5–7.2.

8. A process according to claim 6 wherein filtered air is passed through said primary effluent during said fermentation.

9. A process according to claim 6 wherein the last mentioned effluent is permitted to flow over an oxidizing medium to oxidize any remaining organic matter.

10. A process according to claim 1, wherein said precipitated organic matter is inoculated with *Aspergillus flavus* germs after separation from residual waters.

References Cited in the file of this patent

UNITED STATES PATENTS

| 835,163 | Priestman | Nov. 6, 1906 |
| 1,155,256 | Marchand | Sept. 28, 1915 |
| 1,881,093 | Owen et al. | Oct. 4, 1932 |
| 1,900,995 | Nichols | Mar. 14, 1933 |
| 2,055,475 | Behrman | Sept. 29, 1936 |
| 2,065,123 | Downes | Dec. 22, 1936 |
| 2,122,939 | Hansen | July 5, 1938 |
| 2,318,919 | Brockman | May 11, 1943 |
| 2,382,010 | Hodges | Aug. 14, 1945 |
| 2,609,328 | Reed | Sept. 2, 1952 |

FOREIGN PATENTS

| 565,775 | Great Britain | Nov. 28, 1944 |

OTHER REFERENCES

Inskeep et al.: Article entitled "Food Yeast From Sulfite Liquor," appearing in the August 1951 edition of Industrial and Engineering Chemistry; pages 1702–1711 relied upon.

Hawk et al.: Textbook entitled Practical Physiological Chemistry, 12th edition (1947), page 286 relied upon.